(12) United States Patent
Jahnke

(10) Patent No.: US 11,619,167 B2
(45) Date of Patent: Apr. 4, 2023

(54) ENERGY STORAGE FOR COMBUSTION TURBINE USING MOLTEN CARBONATE ELECTROLYZER CELL

(71) Applicant: FuelCell Energy, Inc., Danbury, CT (US)

(72) Inventor: Fred C. Jahnke, Rye, NY (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 17/582,893

(22) Filed: Jan. 24, 2022

(65) Prior Publication Data

US 2022/0149403 A1  May 12, 2022

Related U.S. Application Data

(63) Continuation of application No. 17/396,888, filed on Aug. 9, 2021, now Pat. No. 11,261,784, which is a
(Continued)

(51) Int. Cl.
*H01M 4/02* (2006.01)
*F02C 6/14* (2006.01)
(Continued)

(52) U.S. Cl.
CPC ............... *F02C 6/14* (2013.01); *C25B 1/02* (2013.01); *C25B 9/05* (2021.01); *C25B 9/67* (2021.01);
(Continued)

(58) Field of Classification Search
CPC ....................................................... H01M 4/02
See application file for complete search history.

(56) References Cited

U.S. PATENT DOCUMENTS 11,043,684 B2  6/2021  Jahnke et al.
2016/0351930 A1  12/2016  Jahnke et al.
(Continued)

FOREIGN PATENT DOCUMENTS

JP  2007-287580 A  11/2007
JP  2017-511956  4/2017
(Continued)

OTHER PUBLICATIONS

International Search Report in PCT/IB2020/050970 dated Apr. 30, 2020 (11 pages).

*Primary Examiner* — Jacob B Marks
(74) *Attorney, Agent, or Firm* — Foley & Lardner LLP

(57) ABSTRACT

An energy storage system includes: a reformer configured to receive natural gas and steam and to output reformed natural gas; a combustion turbine configured to output heated sweep gas; and a molten carbonate electrolyzer cell ("MCEC") including: an MCEC anode, and an MCEC cathode configured to receive the heated sweep gas from the combustion turbine. The energy storage system is configured such that: when no excess power is available, the combustion turbine receives the reformed natural gas from the reformer, and when excess power is available, the MCEC operates in a hydrogen-generation mode in which the MCEC anode receives the reformed natural gas from the reformer, and outputs MCEC anode exhaust that contains hydrogen.

20 Claims, 4 Drawing Sheets

Related U.S. Application Data continuation of application No. PCT/IB2020/050970, filed on Feb. 6, 2020.

(60) Provisional application No. 62/806,995, filed on Feb. 18, 2019.

(51) Int. Cl.

| | |
|---|---|
| *C25B 9/67* | (2021.01) |
| *C25B 9/05* | (2021.01) |
| *C25B 1/02* | (2006.01) |
| *C25B 15/08* | (2006.01) |
| *F02C 6/18* | (2006.01) |
| *H01M 8/04111* | (2016.01) |
| *H01M 8/0612* | (2016.01) |
| *H01M 8/1004* | (2016.01) |
| *H01M 8/1023* | (2016.01) |
| *H01M 8/0656* | (2016.01) |

(52) U.S. Cl.
CPC ............... *C25B 15/08* (2013.01); *F02C 6/18* (2013.01); *H01M 8/04111* (2013.01); *H01M 8/0618* (2013.01); *H01M 8/0656* (2013.01); *H01M 8/1004* (2013.01); *H01M 8/1023* (2013.01); *F05D 2220/72* (2013.01); *H01M 2250/10* (2013.01); *H01M 2250/405* (2013.01)

(56) References Cited

U.S. PATENT DOCUMENTS

| | | |
|---|---|---|
| 2017/0271701 A1 | 9/2017 | Berlowitz et al. |
| 2018/0261860 A1 | 9/2018 | Jahnke et al. |
| 2018/0261864 A1 | 9/2018 | Jahnke et al. |
| 2019/0348699 A1* | 11/2019 | Reytier .............. H01M 8/0271 |

FOREIGN PATENT DOCUMENTS

| | | |
|---|---|---|
| JP | 2018-193612 A | 12/2018 |
| JP | 2019-501852 A | 1/2019 |
| WO | WO-2015/116964 A1 | 8/2015 |

* cited by examiner

ENERGY STORAGE FOR COMBUSTION TURBINE USING MOLTEN CARBONATE ELECTROLYZER CELL

CROSS-REFERENCE TO RELATED APPLICATIONS

The present application is a continuation of U.S. patent application Ser. No. 17/396888, filed on Aug. 9, 2021, which is a continuation of PCT application no. PCT/M2020/050970 filed on Feb. 6, 2020, which claims the benefit of and priority to U.S. Provisional Application No. 62/806,995, filed Feb. 18, 2019, all of which are incorporated by reference herein in their entireties.

BACKGROUND

The present application relates generally to the field of energy storage using fuel cells.

Energy storage may be performed by generating $H_2$ ("hydrogen") from water or hydrocarbons. Storing energy using conventional water electrolyzers can be inefficient and may require temperature control above the temperature available from a combustion turbine, increasing the cost and energy consumption for energy storage. Power levels on the order of 30 to 60 kWh per kilogram of hydrogen produced can be required for conventional high temperature and room temperature electrolyzers.

SUMMARY

Systems and methods of the present disclosure relate to an energy storage system which can store excess energy as hydrogen and produce additional hydrogen from methane. A molten carbonate electrolyzer cell ("MCEC") (also called a reformer-electrolyzer-purifier ("REP")) may be used to generate $H_2$. Examples of REPs and systems that include them are described in PCT Publication No. WO 2015/116964, which is assigned to the assignee of the present application. Power levels below 8 kWh per kilogram of hydrogen produced can be achieved with this technology when partially reformed natural gas feed and steam are fed to the MCEC.

One embodiment relates to an energy storage system which includes a combustion turbine configured to output heated sweep gas. The energy storage system further includes a reformer configured to receive natural gas and steam and to output partially reformed natural gas. The energy storage system further includes a MCEC. The MCEC includes a MCEC anode configured to receive the partially reformed natural gas from the reformer. The MCEC anode is configured to output MCEC anode exhaust that contains greater amount of hydrogen than the partially reformed natural gas it receives from the reformer. The MCEC includes a MCEC cathode configured to receive heated sweep gas from the combustion turbine. The MCEC cathode is configured to output MCEC cathode exhaust. The MCEC is configured to operate in a hydrogen-generation mode. The energy storage system further includes a storage tank configured to receive the MCEC anode exhaust that contains hydrogen.

In one aspect of the energy storage system, which is combinable with the above embodiments and aspects in any combination, an electrochemical hydrogen compressor ("EHC") includes an EHC anode configured to receive the MCEC anode exhaust. The EHC includes an EHC cathode configured to output a purified, pressurized hydrogen-containing stream to the storage tank.

In one aspect of the energy storage system, which is combinable with the above embodiments and aspects in any combination, the EHC anode is configured to output an EHC anode exhaust that contains unrecovered hydrogen and non-hydrogen fuel.

In one aspect of the energy storage system, which is combinable with the above embodiments and aspects in any combination, a burner configured to receive the MCEC cathode exhaust and the EHC anode exhaust, and to increase a temperature of the reformer.

In one aspect of the energy storage system, which is combinable with the above embodiments and aspects in any combination, a burner is configured to receive the heated sweep gas from the combustion turbine and the EHC anode exhaust. The burner is configured to further heat the heated sweep gas before the heated sweep gas is received by the MCEC cathode.

In one aspect of the energy storage system, which is combinable with the above embodiments and aspects in any combination, a methanation catalyst is configured to receive the MCEC anode exhaust and to convert carbon monoxide in the MCEC anode exhaust into methane.

In one aspect of the energy storage system, which is combinable with the above embodiments and aspects in any combination, the combustion turbine is configured to receive part of the reformed natural gas from the reformer as would be the case when no excess power is available for storage.

In one aspect of the energy storage system, which is combinable with the above embodiments and aspects in any combination, a proton exchange membrane (PEM) fuel cell is configured to receive the MCEC anode exhaust from the MCEC and/or a hydrogen-containing stream from the storage tank, and to output electricity.

In one aspect of the energy storage system, which is combinable with the above embodiments and aspects in any combination, the PEM fuel cell is configured to output unreacted fuel. The burner is configured to receive the MCEC cathode exhaust, the EHC anode exhaust (if an EHC is included in the system), and the unreacted fuel from the PEM fuel cell, and to increase a temperature of the reformer.

In one aspect of the energy storage system, which is combinable with the above embodiments and aspects in any combination, a compressor is configured to pressurize and store hydrogen from the MCEC anode exhaust.

In one aspect of the energy storage system, which is combinable with the above embodiments and aspects in any combination, a proton exchange membrane (PEM) fuel cell is configured to receive a purified hydrogen-containing stream from the EHC cathode and/or the storage tank, and to output electricity. the MCEC is configured to operate in a power-generation mode in which the MCEC operates in reverse relative to the hydrogen-generation mode.

In one aspect of the energy storage system, which is combinable with the above embodiments and aspects in any combination, the reformer is a reformer and heat recovery steam generator and steam from the heat recovery steam generator is supplied to the reformer.

In one aspect of the energy storage system, which is combinable with the above embodiments and aspects in any combination, the steam is low-pressure steam.

In one aspect of the energy storage system, which is combinable with the above embodiments and aspects in any combination, the steam is medium-pressure steam.

Another embodiment relates to an energy storage method utilizing a molten carbonate electrolyzer cell ("MCEC")

comprising an MCEC anode and an MCEC cathode, wherein the MCEC is configured to operate in a hydrogen-generation mode and the method comprises outputting heated sweep gas from a combustion turbine; receiving natural gas and steam at a reformer and outputting reformed natural gas; receiving the reformed natural gas from the reformer at the MCEC anode and outputting MCEC anode exhaust that contains hydrogen; receiving the heated sweep gas from the combustion turbine at the MCEC cathode and outputting MCEC cathode exhaust; and receiving the MCEC anode exhaust that contains hydrogen at a storage tank.

In one aspect of the energy storage method, which is combinable with the above embodiments and aspects in any combination, the method further comprises receiving the MCEC anode exhaust at an EHC anode; and outputting a purified hydrogen-containing stream from an EHC cathode to the storage tank.

In one aspect of the energy storage method, which is combinable with the above embodiments and aspects in any combination, the method further comprises receiving the MCEC anode exhaust at a methanation catalyst; and converting carbon monoxide in the MCEC anode exhaust into methane.

In one aspect of the energy storage method, which is combinable with the above embodiments and aspects in any combination, the method further comprises receiving a purified hydrogen-containing stream from the EHC cathode and/or the storage tank; and outputting electricity.

In one aspect of the energy storage method, which is combinable with the above embodiments and aspects in any combination, the method further comprises outputting excess fuel from the PEM fuel cell; receiving the MCEC cathode exhaust, EHC anode exhaust, and the excess fuel from the PEM fuel cell at a burner; and increasing a temperature of the reformer.

DETAILED DESCRIPTION

Figure 4:
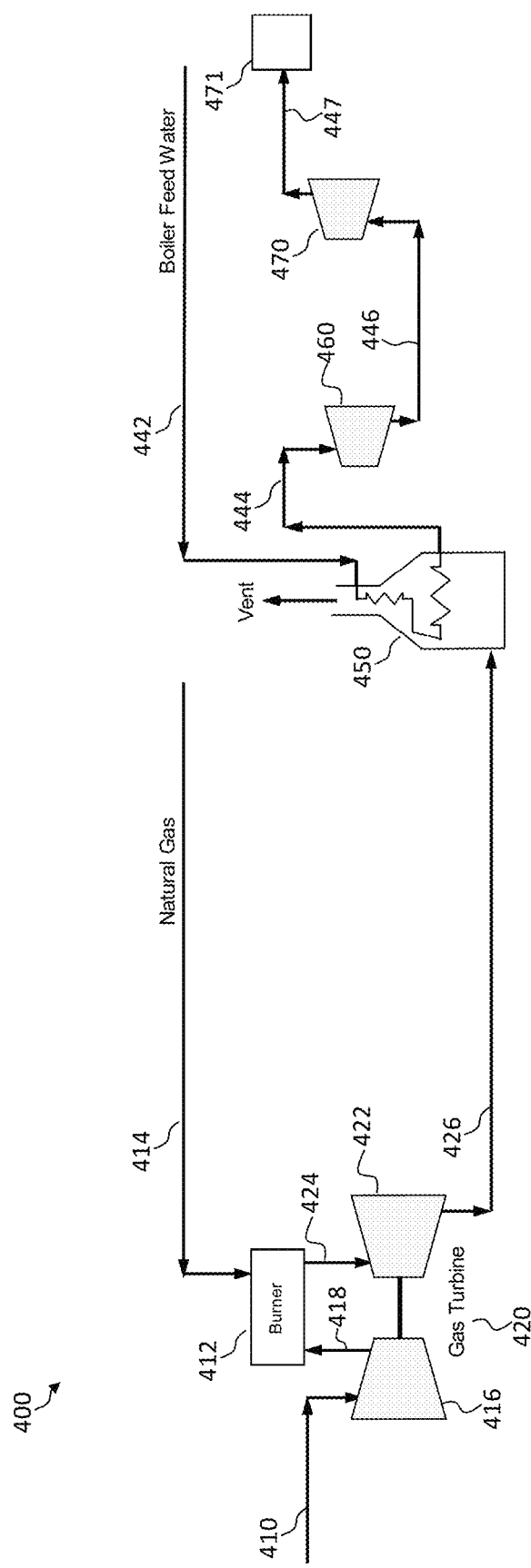
FIG. 4 is a schematic illustration of the prior art showing a combustion turbine combined cycle plant without energy storage.

A schematic illustration of a known combustion turbine combined cycle system is shown in FIG. 4. The system 400 includes a combustion turbine 420 (e.g., gas turbine). Air 410 is supplied to the combustion turbine 420 via the turbine compressor 416 to produce compressed air 418. Fuel 414, such as natural gas, desulfurized natural gas, or other suitable fuel, is supplied to a combustion turbine burner 412. The compressed air 418 is mixed with the fuel 414 and undergoes combustion, generating high temperature gas 424 which is fed to the turbine expander 422 to generate power. Heated gas 426 is output from the combustion turbine 420 and sent to the heat recovery steam generator (HRSG) 450.

In the HRSG, boiler feed water 442 is converted into high pressure steam 444. High pressure steam 444 is output from the HRSG 450 and supplied to steam turbine 460. Steam 446 at a lower pressure than the high pressure steam 444 is output from steam turbine 460 and supplied to steam turbine 470. In steam turbine 460 and steam turbine 470, the pressure of the high pressure steam 444 is reduced as the steam turbine 460 and steam turbine 470 generates power to increase the efficiency of the system 400. Steam 447 at a lower pressure than steam 446 (e.g., below atmospheric pressure) is output from steam turbine 470 and supplied to a condenser 471, where the steam is condensed under vacuum and the condensate can be pumped back to high pressure and used boiler feed water 442. Often, the steam is reheated between the steam turbines (not shown) to further increase power output and overall system efficiency.

While this system 400 can be cost effective and efficient for base load power generation, the system 400 has little load following capability without loss in efficiency and has no capability to store excess power from the grid. Therefore, the MCEC process described in the present disclosure can be added to a combustion turbine combined cycle system to provide efficient energy storage and efficient peak power generation.

An energy storage system according to various exemplary embodiments will be described below. The system includes a combustion turbine (e.g., gas turbine). Heated sweep gas generated by the gas turbine is used to reform natural gas and steam to output reformed natural gas. The reformed natural gas is supplied to a molten carbonate electrolyzer cell ("MCEC") (also called a reformer-electrolyzer-purifier ("REP")), which generates a hydrogen-containing stream. The hydrogen-containing stream may be used in conjunction with an electrochemical hydrogen compressor ("EHC") to further purify and pressurize the hydrogen-containing stream. The hydrogen-containing stream can be stored in a storage tank for use in various applications, such as in a PEM fuel cell for peak power generation.

The energy storage system advantageously uses recovered heat from the combustion turbine by directing the heated sweep gas to a reformer. By producing hydrogen from methane in addition to electrolysis hydrogen, less power is required as compared with conventional electrolysis systems. The power consumption is on the order of 8 kWh per kilogram of hydrogen produced for a system without a EHC, and an additional 5 to 15 kWh per kilogram of hydrogen produced for a system including a EHC, well below typical systems that store excess power as hydrogen that use water electrolysis and require a power input of 45 to 60 kWh per kilogram of hydrogen produced.

Figure 1:
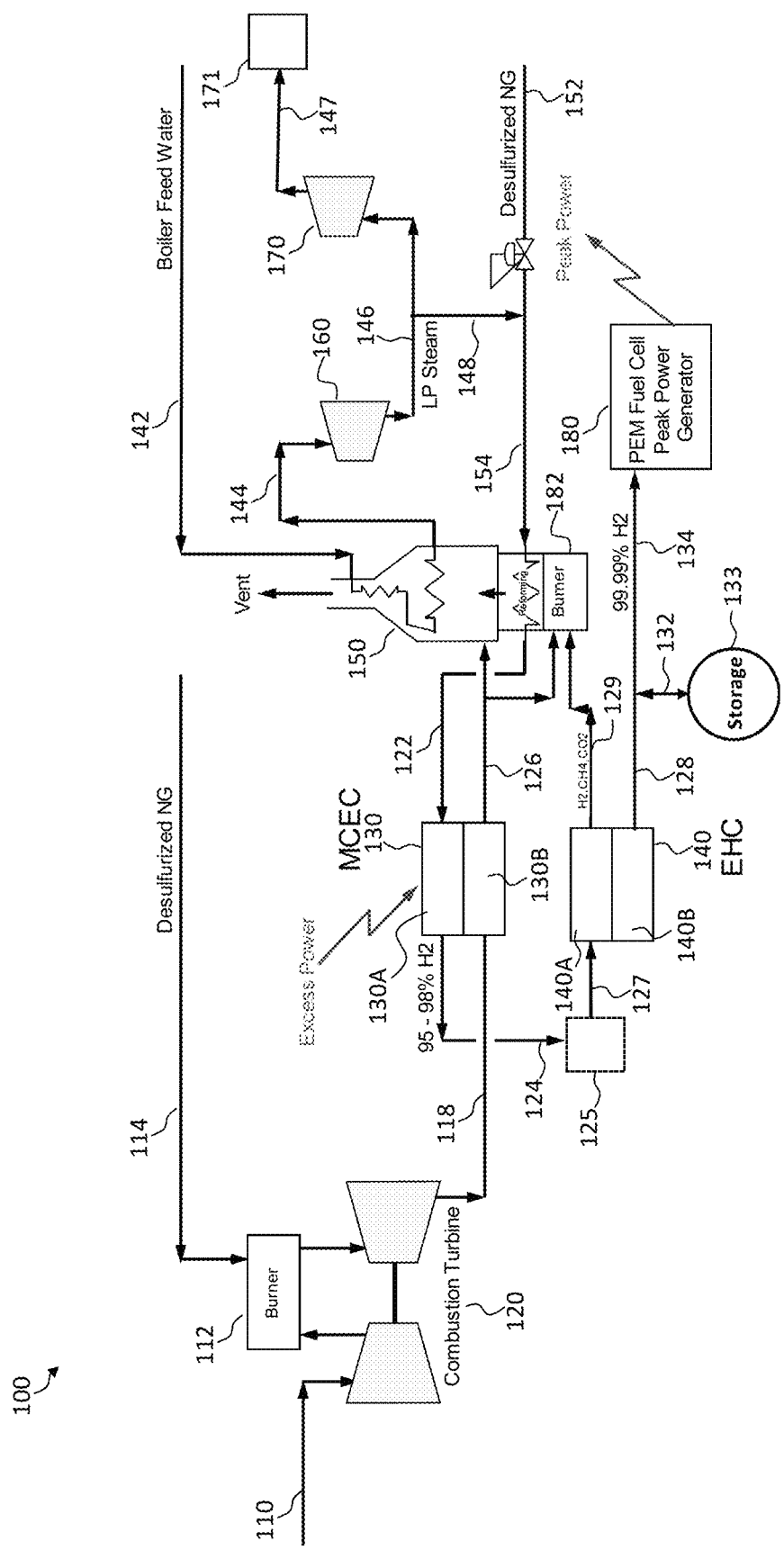
FIG. 1 is a schematic view of an energy storage system, integrated with a combustion turbine combined cycle system, according to an exemplary embodiment.

Referring to FIG. 1, an energy storage system 100 is shown according to an exemplary embodiment. The system 100 includes a combustion turbine 120 (e.g., gas turbine). Air 110 is supplied to the combustion turbine 120. Fuel 114, such as natural gas, desulfurized natural gas, or other suitable fuel, is supplied to a combustion turbine burner 112. The air 110 is mixed with the fuel 114 and undergoes combustion, generating heated sweep gas 118. Heated sweep gas 118 is output from the combustion turbine 120.

The system 100 further includes a reformer and HRSG 150, which may include a steam methane reformer, or other suitable hydrocarbon reformer. Boiler feed water 142 is supplied to the reformer and HRSG 150. Steam 144 is output from the reformer and HRSG 150. The steam 144 is supplied to a steam turbine 160 to generate additional power. The steam turbine 160 outputs low-pressure steam 146. Low-pressure steam 146 can be steam at 15 psia. A portion of the low-pressure steam 148 is mixed with natural gas 152, such as desulfurized natural gas, or other suitable fuel to create a low-pressure steam and natural gas mixture 154. The low-pressure steam and natural gas mixture 154 is supplied to the reformer and HRSG 150. Heated sweep gas 118 originating from the combustion turbine 120 is used to reform the low-pressure steam and natural gas mixture 154 to output reformed natural gas 122. A portion of the low-pressure steam 146 that is not mixed with the natural gas 152 is supplied to a second steam turbine 170. The steam turbine 170 outputs very low-pressure steam 147 (e.g., less than atmospheric pressure) which is condensed under vacuum by cooling in condenser 171.

The system 100 further includes a MCEC 130. The reformed natural gas 122 is supplied to a MCEC 130 operating in a hydrogen-generation mode. The MCEC 130 may be a MCEC assembly including a plurality of electrolyzer fuel cells formed in a fuel cell stack. The MCEC 130 includes a MCEC anode 130A and a MCEC cathode 130B. The MCEC anode 130A receives the reformed natural gas 122 from the reformer and HRSG 150, and outputs MCEC anode exhaust 124 that contains hydrogen. The MCEC cathode 130B receives heated sweep gas 118 from the combustion turbine 120, and outputs MCEC cathode exhaust 126.

The heated sweep gas 118 from the combustion turbine 120 is introduced to the MCEC cathode 130B, which reduces the concentration of $CO_2$ and $O_2$ in the MCEC cathode 130B. This process results in a lower voltage across the MCEC 130 and lower power consumption. If $CO_2$ and $O_2$ is desired as a byproduct, the system 100 may also operate without a portion of the heated sweep gas 118. However, the use of heated sweep gas 118 helps to maintain a uniform temperature in the MCEC cathode 130B, thereby maximizing the life of the MCEC 130. The MCEC cathode 130B outputs MCEC cathode exhaust 126, which can be supplied to the reformer and HRSG 150.

MCEC anode exhaust 124 containing hydrogen is output from the MCEC anode 130A. The MCEC anode exhaust 124 containing hydrogen may include 95-98% $H_2$. The MCEC anode exhaust 124 may also contain excess fuel. For example, the MCEC anode exhaust may include 2-5% $CO_2$, methane, and CO on a dry basis. The MCEC anode exhaust 124 may pass across an optional methanation catalyst 125. The methanation catalyst 125 may convert CO to methane, thereby removing essentially all of the CO in the MCEC anode exhaust 124, and output a methanation catalyst exhaust 127 making the gas suitable for use in an EHC 140 or PEM fuel cell 180. If methanation is not incorporated, CO must be removed by another purification process before it can be used in a PEM peak power generator. One alternate purification system is a pressure swing adsorption system (PSA). After the methanization catalyst, the MCEC anode exhaust is passed to an EHC 140, such as a PEM fuel cell operating in electrolyzer mode, which electrochemically pumps the hydrogen to a high pressure suitable for storage and purifies the methanation catalyst exhaust 127 (e.g., to 99.99% $H_2$ or greater). The EHC 140 includes an EHC anode 140A configured to receive the MCEC anode exhaust 124 or the methanation catalyst exhaust 127, and to output EHC anode exhaust 129. The EHC anode exhaust 129 may contain excess fuel, and may be supplied to a burner 182. The burner 182 can be used to increase a temperature of the reformer and HRSG 150. The EHC 140 includes an EHC cathode 140B configured to output a pressurized, purified hydrogen-containing stream 128.

The purified hydrogen-containing stream 128 can be stored or used directly in applications requiring hydrogen. For example, a portion 132 of the hydrogen-containing stream 128 may be stored in a storage tank 133, and a portion 134 of the hydrogen-containing stream may be used in a PEM fuel cell 180 configured to output electricity during peak power generation. The purified hydrogen-containing stream may be controllably stored in the storage tank 133 or sent immediately to the PEM fuel cell 180, depending on current power demand.

Figure 2:
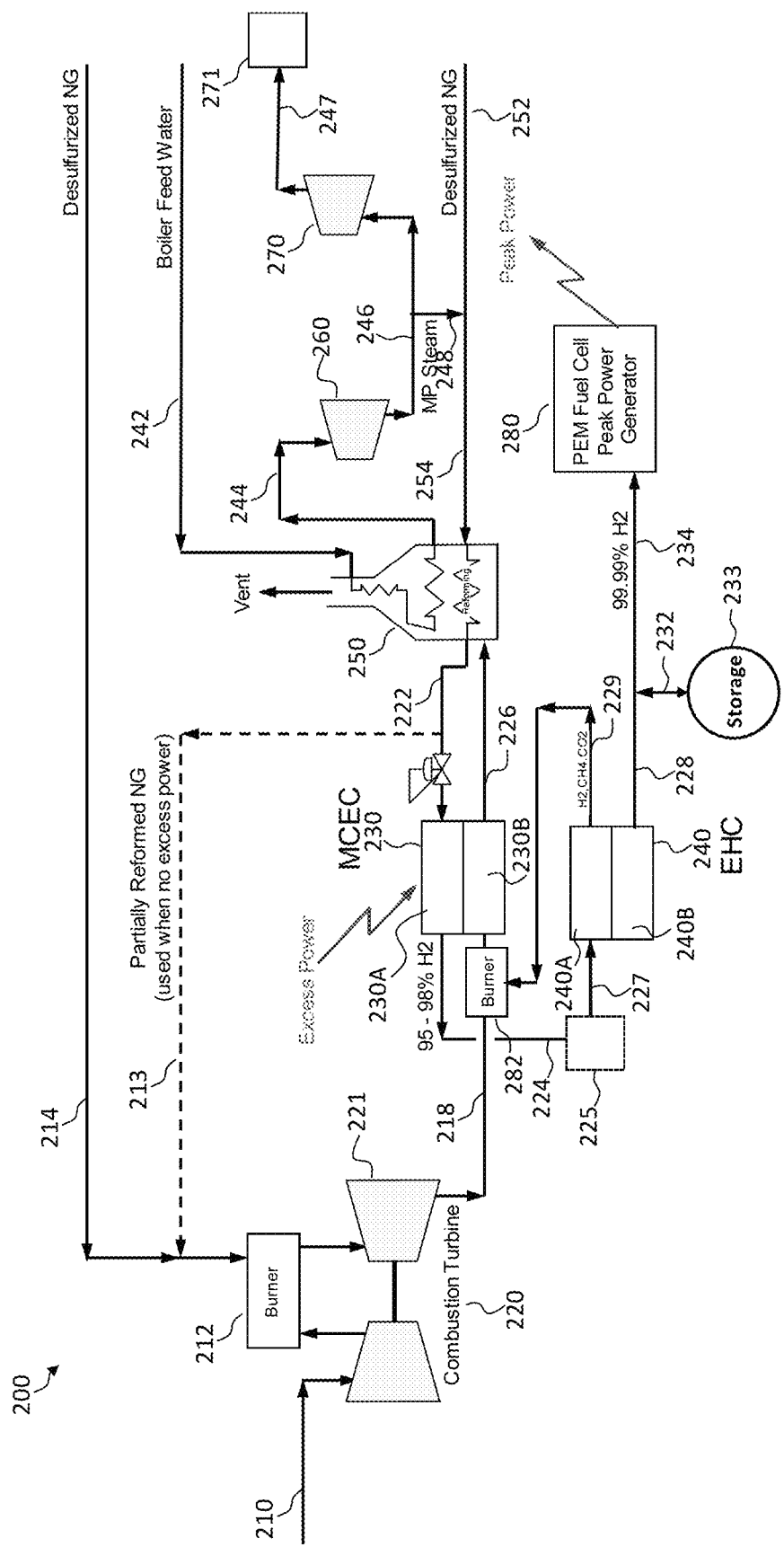
FIG. 2 is a schematic view of another embodiment of the energy storage system, which directs a portion of the reformed natural gas from the reformer to the combustion turbine, according to an exemplary embodiment.

Referring now to FIG. 2, an energy storage system 200 is shown according to a second exemplary embodiment. In energy storage system 200, partially reformed natural gas 213 is sent to the combustion turbine 220 when excess power is not available rather than feeding the reformed natural gas 122 to the MCEC 130, as shown in FIG. 1. The partially reformed natural gas 213 provides an increase to the efficiency of the combustion turbine 220. Further, the MCEC is heated by the heated sweep gas 218 and is ready to generate hydrogen and store power when needed. The system 200 includes a combustion turbine 220 (e.g., gas turbine). Air 210 is supplied to the combustion turbine 220. Fuel 214, such as natural gas, desulfurized natural gas, or other suitable fuel, is supplied to a combustion turbine burner 212. The air 210 is mixed with the fuel 214 and undergoes combustion, generating heated sweep gas 218. Heated sweep gas 218 is output from the combustion turbine 220.

The system 200 further includes a reformer and HRSG 250, which may include a steam methane reformer, or other suitable hydrocarbon reformer. Boiler feed water 242 is supplied to the reformer and HRSG 250. Steam 244 is output from the reformer and HRSG 250. The steam 244 is supplied to a steam turbine 260. The steam turbine 260 outputs medium-pressure steam 246 (e.g. 200 psia which is sufficiency high for the reformed natural gas 213 to be fed to the pressurized combustion turbine burner 212). A portion of the medium-pressure steam 248 is mixed with natural gas 252, such as desulfurized natural gas, or other suitable fuel to create a medium-pressure steam and natural gas mixture 254. The medium-pressure steam and natural gas mixture 254 is supplied to the reformer and HRSG 250 which operates at a higher pressure sufficient to feed the combustion turbine 220. Partially reformed fuel 213 supplied from the reformer and HRSG 250 to the combustion turbine burner 212 increases the amount of heat released by the fuel in the burner 212, thus requiring less fuel and increasing the efficiency. The excess steam in the reformer and HRSG 250 also increases the power output when it is expanded in the combustion turbine expander 221. Heated sweep gas 218 originating from the combustion turbine 220 is used to provide heat for reforming the medium-pressure steam and natural gas mixture 254 to output reformed natural gas 222. A portion of the medium-pressure steam 246 that is not mixed with the natural gas 252 is supplied to a steam turbine 270. The steam turbine 270 outputs additional power and produces a low-pressure steam 247. The low-pressure steam 247 is sent to a condenser 271 and the condensate is recycled to the system 200 through a pump as boiler feed water 242. The reformed natural gas 213 can be all of the partially reformed natural gas, or any portion of the reformed natural gas 222.

The system 200 further includes a MCEC 230. The reformed natural gas 222 is supplied to a MCEC 230 operating in a hydrogen-generation mode. The MCEC 230 can be a MCEC assembly including a plurality of electrolyzer fuel cells formed in a fuel cell stack. The MCEC 230 includes a MCEC anode 230A and a MCEC cathode 230B. The MCEC anode 230A receives the partially reformed natural gas 222 from the reformer and HRSG 250, and outputs MCEC anode exhaust 224 that contains hydrogen. The MCEC cathode 230B receives heated sweep gas 218 from the combustion turbine 220, and outputs MCEC cathode exhaust 226.

The heated sweep gas 218 from the combustion turbine 220 can be introduced to the MCEC cathode 230B, which reduces the concentration of $CO_2$ and $O_2$ in the MCEC cathode 230B. This process results in a lower voltage across the MCEC 230 and lower power consumption. If $CO_2$ and $O_2$ is desired as a byproduct, the system 200 may also operate without a portion of the heated sweep gas 218. However, the use of heated sweep gas 218 helps to maintain a uniform temperature in the MCEC cathode 230B, thereby maximizing the life of the MCEC 230. The MCEC cathode 230B outputs MCEC cathode exhaust 226, which can be supplied to the reformer and HRSG 250.

MCEC anode exhaust 224 containing hydrogen is output from the MCEC anode 230A. The MCEC anode exhaust 224 containing hydrogen can include 95-98% $H_2$. The MCEC anode exhaust 224 may also contain excess fuel. For example, the MCEC anode exhaust 224 may include 2-5% $CO_2$, methane, and CO on a dry basis. The MCEC anode exhaust 224 may pass across an optional methanation catalyst 225. The methanation catalyst 225 may convert CO to methane, thereby removing essentially all of the CO in the MCEC anode exhaust 224, and output a methanation catalyst exhaust 227, making the gas suitable for use in an EHC 240 or PEM fuel cell 280. The methanization catalyst produces a CO free MCEC anode exhaust which is passed to an EHC 240, such as a PEM fuel cell operating in electrolyzer mode, which electrochemically pumps the hydrogen to a high pressure and purifies the methanation catalyst exhaust 227 (e.g., to 99.99% $H_2$ or greater) in one step. The EHC 240 includes an EHC anode 240A configured to receive the MCEC anode exhaust 224 or the methanation catalyst exhaust 227, and to output EHC anode exhaust 229. The EHC anode exhaust 229 may contain excess fuel, and may be supplied to a burner 282. The burner 282 can be configured to receive the heated sweep gas 218 from the combustion turbine 220 and the EHC anode exhaust 229 and to further heat the heated sweep gas 218 before the heated sweep gas 218 is received by the MCEC cathode 230B. The burner 282 can be used to increase a temperature of the MCEC 230, instead of the reformer and HRSG 150 as shown in FIG. 1. The EHC 240 includes an EHC cathode 240B configured to output a pressurized, purified hydrogen-containing stream 228.

The purified hydrogen-containing stream 228 can be stored or used directly in applications requiring hydrogen. For example, a portion 232 of the hydrogen-containing stream 228 may be stored in a storage tank 233, and a portion 234 of the hydrogen-containing stream may be used in a PEM fuel cell 280 configured to output electricity during peak power generation. The purified hydrogen-containing stream may be controllably stored in the storage tank 233 or sent immediately to the PEM fuel cell 280, depending on current power demand.

Figure 3:
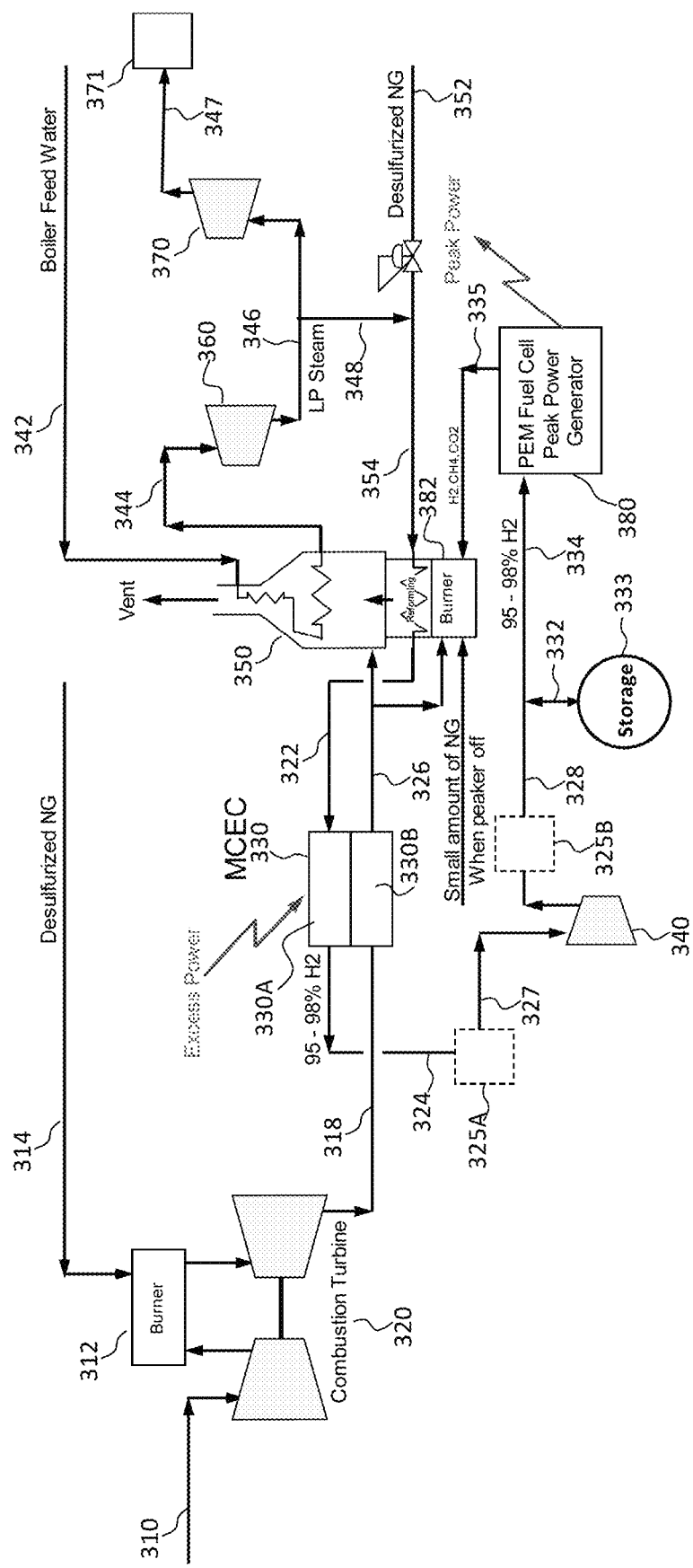
FIG. 3 is a schematic view of another embodiment of the energy storage system, which uses a compressor for hydrogen storage, according to an exemplary embodiment.

Referring now to FIG. 3, an energy storage system 300 is shown according to a third exemplary embodiment. In energy storage system 300, a compressor 340, rather than an EHC, is used prior to hydrogen storage. In this configuration, a hydrogen-containing stream from an MCEC anode (e.g. 95-98% $H_2$) is sent to the storage tank 333 and/or PEM 380. The system 300 includes a combustion turbine 320 (e.g., gas turbine). Air 310 is supplied to the combustion turbine 320. Fuel 314, such as natural gas, desulfurized natural gas, or other suitable fuel, is supplied to a combustion turbine burner 312. The air 310 is mixed with the fuel 314 and undergoes combustion, generating heated sweep gas 318. Heated sweep gas 318 is output from the combustion turbine 320.

The system 300 further includes a reformer and HRSG 350, which may include a steam methane reformer, or other suitable hydrocarbon reformer. Boiler feed water 342 is supplied to the reformer and HRSG 350. Steam 344 is output from the reformer and HRSG 350. The steam 344 is supplied to a steam turbine 360. The steam turbine 360 outputs low-pressure steam 346. Low-pressure steam 346 can be steam at 15 psia. A portion of the low-pressure steam 348 is mixed with natural gas 352, such as desulfurized natural gas, or other suitable fuel to create a low-pressure steam and natural gas mixture 354. The low-pressure steam and natural gas mixture 354 is supplied to the reformer and HRSG 350. Heated sweep gas 318 originating from the combustion turbine 320 is used to provide the heat needed to reform the low-pressure steam and natural gas mixture 354 to output reformed natural gas 322. A portion of the low-pressure steam 346 that is not mixed with the natural gas 352 is supplied to a second steam turbine 370. The steam turbine 370 outputs very low-pressure steam 347 (e.g, less than atmospheric pressure) which is condensed under vacuum by cooling in condenser 371.

The system 300 further includes a MCEC 330. The reformed natural gas 322 is supplied to a MCEC 330 operating in a hydrogen-generation mode. The MCEC 330 may be a MCEC assembly including a plurality of electrolyzer fuel cells formed in a fuel cell stack. The MCEC 330 includes a MCEC anode 330A and a MCEC cathode 330B. The MCEC anode 330A receives the reformed natural gas 322 from the reformer and HRSG 350, and outputs MCEC anode exhaust 324 that contains hydrogen. The MCEC cathode 330B receives heated sweep gas 318 from the combustion turbine 320, and outputs MCEC cathode exhaust 326.

The heated sweep gas 318 from the combustion turbine 320 is introduced to the MCEC cathode 330B, which reduces the concentration of $CO_2$ and $O_2$ in the MCEC cathode 330B. This process results in a lower voltage across the MCEC 330 and lower power consumption. If $CO_2$ and $O_2$ is desired as a byproduct, the system 300 may also operate without a portion of the heated sweep gas 318. However, the use of heated sweep gas 318 helps to maintain a uniform temperature in the MCEC cathode 330B, thereby maximizing the life of the MCEC 330. The MCEC cathode 330B outputs MCEC cathode exhaust 326, which can be supplied to the reformer and HRSG 350.

MCEC anode exhaust 324 containing hydrogen is output from the MCEC anode 330A. The MCEC anode exhaust 324 can include 95-98% $H_2$. The MCEC anode exhaust 324 may also contain excess fuel. For example, the MCEC anode exhaust 324 can include 2-5% $CO_2$, methane, and CO on a dry basis. The MCEC anode exhaust 324 may pass across an optional methanation catalyst 325A. The methanation catalyst 325A may convert CO to methane, thereby removing essentially all of the CO in the MCEC anode exhaust 324, and output a methanation catalyst exhaust 327 making the gas suitable for use in a PEM fuel cell 380. The MCEC anode exhaust 324 may be methanated as the MCEC anode exhaust 234 is cooled to remove essentially all CO and make the MCEC anode exhaust 324 suitable for use as fuel in a PEM power generator. Alternately, the CO may be removed by a PSA 325B downstream of the exhaust gas compressor 340.

The MCEC anode exhaust 324 may be supplied to a compressor 340. The compressor 340 outputs a pressurized hydrogen-containing stream 328. The hydrogen-containing stream 328 can be stored or used directly in applications requiring hydrogen. For example, a portion 332 of the hydrogen-containing stream 328 may be stored in a storage tank 333, and a portion 334 of the hydrogen-containing stream may be used in a PEM fuel cell 380 configured to output electricity during peak power generation. The hydrogen-containing stream may be controllably stored in the storage tank 333 or sent immediately to the PEM fuel cell 380, depending on current power demand. Generally during peak power demand, the MCEC 330, which uses power, will be turned off and the PEM fuel cell will be fed from the storage tank 333 in order to maximize the net power generated. In some cases, the MCEC 330 will be operated in a manner to produce power to further increase the peak power generation.

While the purity of hydrogen received in the storage tank 333 and/or PEM fuel cell 380 is lower than in the first two embodiments described above, the elimination of the EHC offers a lower cost option. Because the hydrogen stored in the storage tank 333 is approximately 95-98% $H_2$, the PEM fuel cell 380 can output excess fuel 335 (e.g., hydrogen fuel and non-hydrogen fuel). The excess fuel 335 can be supplied to a burner 382, which can be used to heat the reformer and HRSG 350.

According to certain embodiments, the MCEC 130, 230, 330 can operating in a power-generation mode in which the MCEC 130, 230, 330 operates in reverse relative to the hydrogen-generation mode. The operation of the MCEC 130, 230, 330 in reverse allows the MCEC 130, 230, 330 to operate as a conventional fuel cell to receive hydrogen as fuel and generate power.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, structures, values of parameters, mounting arrangements, use of materials, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An energy storage system comprising:
    a reformer configured to receive natural gas and steam and to output reformed natural gas;
    a combustion turbine configured to output heated sweep gas; and
    a molten carbonate electrolyzer cell ("MCEC") comprising:
        an MCEC anode, and
        an MCEC cathode configured to receive the heated sweep gas from the combustion turbine, wherein:
    the energy storage system is configured such that:
        when no excess power is available, the combustion turbine receives the reformed natural gas from the reformer, and
        when excess power is available, the MCEC operates in a hydrogen-generation mode in which the MCEC anode receives the reformed natural gas from the reformer, and outputs MCEC anode exhaust that contains hydrogen.

2. The energy storage system of claim 1, further comprising:
    an electrochemical hydrogen compressor ("EHC") comprising:
        an EHC anode configured to receive the MCEC anode exhaust, and
        an EHC cathode configured to output a purified hydrogen-containing stream.

3. The energy storage system of claim 2, further comprising:
    a storage tank configured to receive the purified hydrogen-containing stream.

4. The energy storage system of claim 2,
    a proton exchange membrane (PEM) fuel cell configured to receive the purified hydrogen-containing stream from the EHC cathode and to output electricity.

5. The energy storage system of claim 2, wherein the EHC anode is configured to output an EHC anode exhaust that contains excess fuel.

6. The energy storage system of claim 5, further comprising:
a burner configured to receive the heated sweep gas from the combustion turbine, and to further heat the heated sweep gas using heat from the EHC anode exhaust before the heated sweep gas is received by the MCEC cathode.

7. The energy storage system of claim 2, further comprising:
a methanation catalyst configured to receive the MCEC anode exhaust and to convert carbon monoxide in the MCEC anode exhaust into methane.

8. The energy storage system of claim 1, further comprising:
a proton exchange membrane (PEM) fuel cell configured to receive the MCEC anode exhaust from the MCEC and to output electricity.

9. The energy storage system of claim 1, wherein the energy storage system is configured such that, when no excess power is available, the MCEC operates in a power-generation mode in which the MCEC operates in reverse relative to the hydrogen-generation mode.

10. The energy storage system of claim 1, further comprising:
a heat recovery steam generator configured to generate the steam and supply the steam to the reformer.

11. An energy storage method utilizing a molten carbonate electrolyzer cell ("MCEC") comprising an MCEC anode and an MCEC cathode, the method comprising:
receiving natural gas and steam at a reformer and outputting reformed natural gas from the reformer;
outputting heated sweep gas from a combustion turbine;
receiving the heated sweep gas from the combustion turbine at the MCEC cathode;
when no excess power is available, receiving the reformed natural gas from the reformer at the combustion turbine; and
when excess power is available, operating in a hydrogen-generation mode, receiving the reformed natural gas from the reformer at the MCEC anode, and outputting MCEC anode exhaust that contains hydrogen from the MCEC anode.

12. The energy storage method of claim 11, further comprising an electrochemical hydrogen compressor ("EHC"), the method comprising:
receiving the MCEC anode exhaust at an EHC anode; and
outputting a purified hydrogen-containing stream from an EHC cathode.

13. The energy storage method of claim 12, comprising:
receiving the purified hydrogen-containing stream at a storage tank.

14. The energy storage method of claim 12, comprising:
receiving the purified hydrogen-containing stream from the EHC cathode at a proton exchange membrane (PEM) fuel cell; and
outputting electricity.

15. The energy storage method of claim 12, comprising:
outputting an EHC anode exhaust that contains excess fuel from the EHC anode.

16. The energy storage method of claim 15, comprising:
receiving the heated sweep gas from the combustion turbine at a burner; and
further heating the heated sweep gas using heat from the EHC anode exhaust before the heated sweep gas is received by the MCEC cathode.

17. The energy storage method of claim 12, comprising:
receiving the MCEC anode exhaust at a methanation catalyst; and
converting carbon monoxide in the MCEC anode exhaust into methane.

18. The energy storage method of claim 11, comprising:
receiving the MCEC anode exhaust from the MCEC at a proton exchange membrane (PEM) fuel cell; and
outputting electricity.

19. The energy storage method of claim 11, comprising:
when no excess power is available, operating in a power-generation mode in which the MCEC operates in reverse relative to the hydrogen-generation mode.

20. The energy storage method of claim 11, comprising:
generating the steam at a heat recovery steam generator; and
supplying the steam to the reformer.

* * * * *